United States Patent [19]
Anderson et al.

[11] Patent Number: 5,666,221
[45] Date of Patent: Sep. 9, 1997

[54] BINARY OPTIC IMAGING SYSTEM

[75] Inventors: John S. Anderson, Santa Monica; Gary R. Noyes, Los Angeles, both of Calif.

[73] Assignee: Hughes Electronics, Los Angeles, Calif.

[21] Appl. No.: 522,062

[22] Filed: Aug. 31, 1995

Related U.S. Application Data

[63] Continuation of Ser. No. 229,849, Apr. 19, 1994, abandoned, which is a continuation of Ser. No. 915,574, Jul. 20, 1992, abandoned.

[51] Int. Cl.⁶ .................................................. G02B 5/18
[52] U.S. Cl. ...................... 359/356; 359/569; 250/332; 250/352; 250/353
[58] Field of Search ........................ 359/558, 566, 359/569, 355, 356; 250/332, 352, 353

[56] References Cited

U.S. PATENT DOCUMENTS

| | | | |
|---|---|---|---|
| 4,507,551 | 3/1985 | Howard et al. | 250/216 |
| 4,535,240 | 8/1985 | Vigurs | 359/356 |
| 4,783,593 | 11/1988 | Noble | 250/352 |
| 4,827,130 | 5/1989 | Reno | 250/332 |
| 4,895,790 | 1/1990 | Swanson et al. | 359/569 |
| 4,994,664 | 2/1991 | Veldkamp | 250/332 |
| 4,996,427 | 2/1991 | Noble et al. | 250/332 |
| 5,013,133 | 5/1991 | Buralli et al. | 359/558 |
| 5,093,574 | 3/1992 | Pratt et al. | 250/339.14 |
| 5,257,133 | 10/1993 | Chen | 359/356 |
| 5,258,618 | 11/1993 | Noble | 250/332 |
| 5,401,968 | 3/1995 | Cox | 250/332 |
| 5,422,475 | 6/1995 | Norton | 250/332 |
| 5,502,300 | 3/1996 | McKeag et al. | 250/222.2 |

FOREIGN PATENT DOCUMENTS

| | | | |
|---|---|---|---|
| 0186801 | 8/1991 | Japan | 359/356 |

OTHER PUBLICATIONS

M.I.T. Lincoln Laboratory "Infra-Red Applications of Diffractive Optical Elements", G.J. Swanson and W.B. Veldkamp, *SPIE Proceedings*, vol. 885, Paper #22, 1988.

Binary Optics Technology: The Theory and Design of Multi-Level Diffractive Optical Elements.

G.J. Swanson, Massachusetts Institute of Technology Lincoln Laboratory; Technical Report 854; 14 Aug. 89.

*Primary Examiner*—Paul M. Dzierzynski
*Assistant Examiner*—John Juba, Jr.
*Attorney, Agent, or Firm*—Gordon R. Lindeen, III; Michael W. Sales; Wanda K. Denson-Low

[57] ABSTRACT

An imaging system (10) contains a diffractive optic lens (14) which allows for a relatively accurate representation of objects within a field of view. These objects are associated with light rays (20, 22 and 24) which are made to impinge upon the diffractive optic lens (14) and thereafter are made to be received by an imaging surface (12) at a receiving angle which may be determined by the structure of the diffractive optic lens (14). The diffractive optic lens (14) may be placed within the typical dewar (16) of the image acquisition system (10), may be removable deployed over the imaging surface (12), or alternatively, the diffractive optic lens may be etched upon the front side of the imaging surface (12) by the use of standard etching techniques such as lithography, diamond turning and the like.

7 Claims, 1 Drawing Sheet

BINARY OPTIC IMAGING SYSTEM

This is a continuation application Ser. No. 08/229,849, filed on Apr. 19, 1994 which is a continuation of Ser. No. 07/915,574 filed Jul. 20, 1992 of John S. Anderson and Gary R. Noyes, both applications now abandoned.

TECHNICAL FIELD

This invention relates to an imaging system and, more particularly, to an imaging system having a diffractive optic lens disposed therein which causes electromagnetic radiation to impinge upon the imaging surface of the system at a selectable angle relative to the system's optical axis.

BACKGROUND ART

Imaging systems are used in a wide variety of applications requiring the acquisition and detection of events within a specified field of view. These events are detected by the reception of their associated electromagnetic radiation, such as light rays. While these imaging systems have been proven to be quite useful in the detection of these events, they have generally employed lenses which are required to have the limiting aperture stop located external to and to the rear of the lenses, usually within a cryogenic dewar. In this configuration, the off-axis light ray bundles strike the receptive medium, such as a bulk silicon detector array, at an angle that varies linearly with the off-axis image location. This characteristic may be undesirable in some applications and techniques involving conventional optics do exist for remedying the situation. The standard procedure is to employ an "immersion lens" in close proximity to the receptive medium.

These conventional immersion lenses have been found, however, to introduce significant amounts of imaging aberrations, primarily in the form of field curvature and lateral color. Compensating for the induced aberrations of these conventional lenses has required extensive modifications to the usual image-forming optics associated with the imaging systems. These conventional immersion lenses cannot simply be added to an existing optical system. Lastly, these conventional immersion lenses have a significant amount of mass, which must be cooled, resulting in a concomitant increase in energy expended by the overall sensor system.

SUMMARY OF THE INVENTION

According to one aspect of the invention, a device is provided for acquiring an image onto a receptive medium having a number of imaging detectors, and further having an optical axis passing through the imaging surface. The device also comprises a diffractive optic lens, optically coupled to the imaging surface and which causes a ray, received at a first angle of incidence relative to the optical axis, to impinge the imaging surface at a second angle of incidence relative to the optical axis.

According to the teachings of the present invention, a diffractive optic lens may be added to a typical imaging system, and more particularly to the imaging surface of the system, such that the received electromagnetic light radiation may be caused to impinge upon the imaging surface in a substantially telecentric manner. This diffractive optic lens may be introduced within the overall imaging system without significant modifications to the image-forming optical entities associated therewith because this diffractive optic lens has been found to achieve these general telecentric result without the introduction of significant aberrations to the received electromagnetic light radiation and the resultant image formed thereby. Additionally, in cryogenic applications, the use of such a diffractive optic lens reduces the cooling energy expended by the overall sensor system as compared to the use of a conventional immersion lens. This reduction in cooling requirements is due to the relatively small amount of mass associated with the diffractive optic lens and further allows for the conservation of energy associated therewith.

The diffractive optic lens, in one embodiment, may be placed in a dewar of the imaging system in close proximity to, or in actual contact with, the surface upon which the image is formed. Alternatively, in another embodiment, the diffractive optic surface may be etched or formed directly upon the front surface of the bulk silicon detector substrate associated with the imaging surface. This etching achieves telecentricity of the impinging electromagnetic light radiation within the bulk medium, without the introduction of a lens within the dewar and results in a relatively simple addition to the overall imaging system. Further, the diffractive optic lens associated with all of the aforementioned embodiments may be geometrically constructed such that the received electromagnetic light radiation may be caused to impinge the imaging surface at virtually any desired angle relative to the optical axis of the system.

The key attribute to all above aspects of this invention is the fact that the added diffractive lens (or diffractive surface) introduce very small aberrations to the formed image, such that the diffractive lens can be added to an existing optical system (to achieve telecentricity, or any other chief ray angle bending desired) without perturbation or redesign of the existing optical system while maintaining the original high quality image as formed by the existing optical system.

DESCRIPTION OF THE PREFERRED EMBODIMENT

Figure 1:
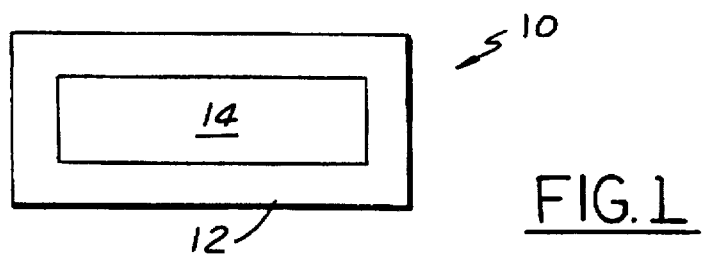
FIG. 1 is a front view of an imaging system made in accordance with the teachings of a first embodiment of this invention.

Referring now to FIG. 1, there is illustrated an imaging system 10 having an imaging surface 12 over which a diffractive optic lens 14 is disposed. Imaging surface 12 is used, by system 10, to receive and detect electromagnetic radiation, such as light, and for this purpose usually defines a plurality of imaging detectors 16 therein (FIG. 3). Accordingly, surface 12 is usually constructed of etchable material such as silicon, or other compounds, and detectors 16 are formed within surface 12 by typical etching techniques. This diffractive optic lens 14 may be disposed within the usual dewar 18 of the imaging system 10 (FIG. 2), on one embodiment of this invention, and positioned such that the typical electromagnetic radiation rays 20, 22 and 24 emanating from a distant light source 26 (associated with an event to be detected) may be received therein and then subsequently transferred to the imaging surface 12 and more particularly to the detectors 16 defined within surface 12.

Specifically, in the first embodiment, the diffractive optic lens 14 may be deployed upon, or in close proximity to (i.e., closely spaced apart from), the imaging surface 12 such that the usual optical axis 28 of the imaging system 10 is made to be substantially perpendicular to both imaging surface 12 and the diffractive optic lens 14 and is further made to pass substantially through the center of both. Lens 14 may be mounted within dewar 18 by any one of a number of usual methods, including the use of usual support members (not shown), and in the preferred embodiment of this invention is made to be removable for maintenance purposes. Diffractive optic lenses, such as lens 14, are known in the art and may be formed in a number of typical geometric shapes in order to allow received radiation rays, such as light, to pass through and eventually impinge upon another surface at virtually any desired angle.

In operation, typical light rays 20, 22 and 24 are received in the dewar 18 of system 10 in the usual manner; i.e., these are chief rays passing through the center of the aperture stop 8. These light rays 20, 22 and 24 then traverse through the dewar 18 and are made to impinge upon the front surface 30 of the diffractive optic lens 14 at angles 25, 27 and 29, respectively, relative to optical axis 28. Thereafter, rays 20, 22 and 24 are passed through the diffractive optic lens 14, in the usual manner (i.e. through back surface 32 of lens 14), and are made to impinge upon the imaging surface 12 in a substantially telecentric manner. That is, the rays 20, 22 and 24 upon leaving the surface 32 of diffractive optic lens 14 are substantially parallel to the optical axis 28 of the imaging system 10. This telecentricity allows for the creation of relatively sharp images associated with light source 26, and this telecentricity is achieved without the creation of substantial amounts of aberration, including lateral color and field curvature, associated with conventional immersion lenses. Furthermore, the geometric configuration of surfaces 30 and 32 of diffractive lens 14 may be adjusted, by typical methods, in order to force a received light ray 34 to impinge upon surface 12 at substantially any desired angle 36 relative to optical axis 28. This feature of binary lens 14 allows a user of optical system 10 greater flexibility in the applications in which system 10 is deployed.

Figure 2:
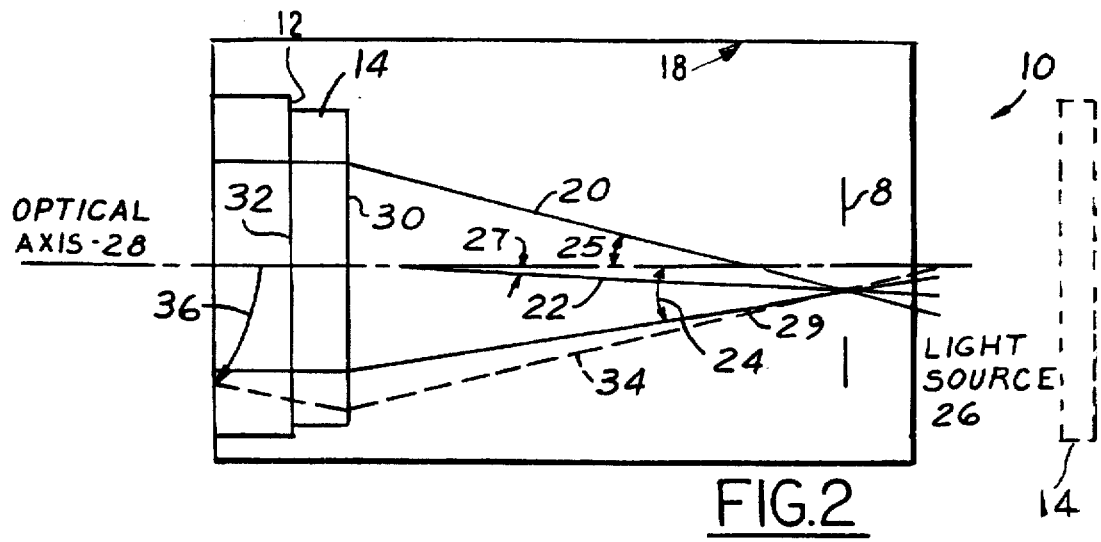
FIG. 2 is a side view of the imaging system shown in FIG. 1.
Figure 3:
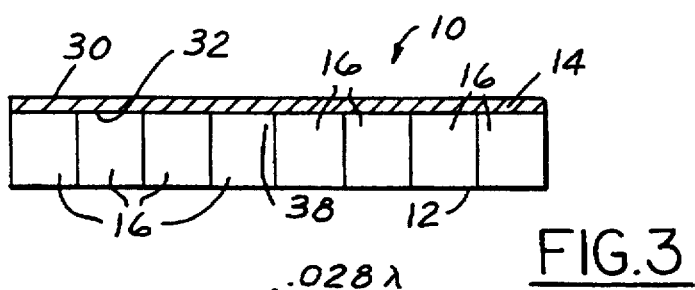
FIG. 3 is a partial side view of an imaging system made in accordance with a second, and alternate, embodiment of this invention and illustrating the etching of a diffractive optic lens upon the imaging surface.

The use of the diffractive optic lens 14 in combination with the imaging array 12, as shown in FIG. 2, may be achieved, in a second embodiment of this invention, by the use of standard fabrication techniques (e.g., diamond turning, photolithography, or otherwise). As shown in FIG. 3, surface 12 is usually formed of a substrate 38 containing a number of detectors 16. In this second embodiment of this invention, a diffractive lens 14 is etched or formed onto the substrate 38 such that lens 14 resides over the detectors 16 and is made receive light rays 20, 22, 24, and 34 at its surface 30 in the aforedescribed manner. Surface 32 of lens 14 is made to reside in contact with a surface of each of the detectors 16.

Fabricating the lens 14 onto substrate 38 in this manner provides for greater simplicity of system 10 in that a separate lens entity is no longer needed and reduces energy expenditures due to a reduction in lens cooling requirements. Further, neither the deployment of diffractive lenses in the first nor the second embodiment of this invention requires substantial modifications to the existing image-forming optical entities of imaging system 10. In yet a third embodiment of this invention, lens 14 may represent a separate optical entity and may be removably deployed over surface 12, as generally illustrated in FIG. 1, but located outside of the dewar 18. Indeed, a dewar might not even be employed in such an embodiment of system 10. This further allows for greater flexibility and deployment of lens 14.

Figure 4:
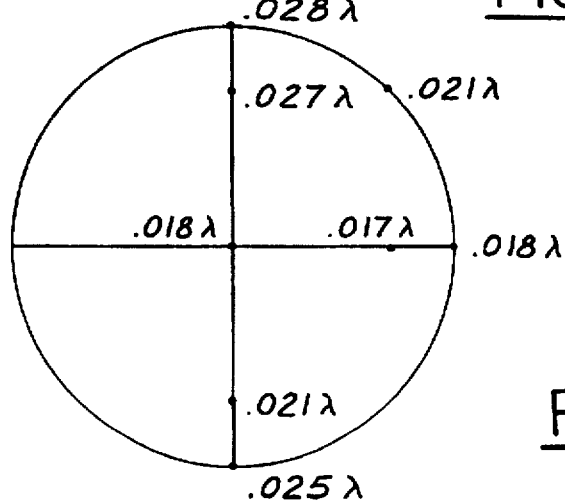
FIG. 4 is a diagram representing the wavefront errors associated with the use of the diffractive optic lens with an imaging system in accordance with the teachings of this invention.

Referring now to FIG. 4, there is shown a diagram associated with the acquisition of an image of a point light source for various field of view positions by an f/3.3 optical system 10 and diffractive lens 14 onto the imaging array 12. The diagram is exemplary of a particular state of correction achieved by a diffractive lens used wherein the top off-axis chief ray angle 25 is +36°, the on-axis chief ray angle 27 is +17, and the bottom off-axis chief angle 29 is -2°. Before the use of the diffractive lens the wavefront quality at each image point is perfect: zero wavelengths error root mean square (0λ RMS). The addition of the diffractive lens renders all three chief ray angles 25, 27, 29 telecentric while only introducing a very slight degradation to the imaging wavefront quality. FIG. 4 shows these degradations ranging from 0.017 λ to 0.028 λ where λ=10 μm monochromatic. These induced errors are very small and the example is illustrative as to how a typical immersion diffractive lens can be added to an existing off-axis optical system 10 to achieve telecentricity without modification to that existing optical system and still achieve excellent image quality.

It is to be understood that the invention is not limited to the exact construction or method illustrated and described above, but that various changes and modifications may be made without departing from the spirit and scope of the invention as defined in the following claims.

We claim:
1. An imaging system comprising:
   (a) a plurality of imaging detectors defining an imaging surface;
   (b) a binary diffractive optic lens means having a predetermined structure, optically coupled with said imaging surface, for receiving electromagnetic radiation, said electromagnetic radiation further received at a predetermined receiving angle, that is not normal to said imaging surface, said receiving angle determined by said predetermined structure of said binary diffractive optic lens means and for causing said received radiation to telecentrically impinge said imaging surface; and
   (c) a dewar, said dewar further comprising an off-axis cold aperture stop said lens means positioned opposite said off-axis cold aperture stop and cooperatively associated with and integral to said dewar.

2. The imaging system of claim 1 wherein said binary diffractive optic lens means includes a thin, planar substrate having at least one surface with a grating, said substrate being separated from said dectectors.

3. The imaging system of claim 1 further including a bulk silicon substrate having opposing first and second surfaces, wherein said diffractive optic lens means is located on said first surface, and wherein the second surface of said substrate forms said imaging surface.

4. The device of claim 3, wherein said diffractive lens means includes diffractive features that are etched onto said first surface of said substrate.

5. The imaging system of claim 1 wherein said detectors are infrared detectors, and wherein said diffractive optic lens means causes infrared radiation to telecentrically impinge said imaging surface.

6. An imaging device comprising:

an infrared imaging array having a planer surface;

a dewar containing said imaging array said dewar further comprising an off axis cold aperture stop;

a binary optical assembly, located outside of said dewar, for focusing electromagnetic radiation on said imaging array; wherein said binary optical assembly further comprises a thin, planar substrate having a surface with diffractive features, said substrate decreasing the angle of incidence at which said radiation impinges upon said planar array surface.

7. The device of claim 6, wherein said substrate is positioned within said dewar and spaced apart from said imaging array.

* * * * *